US012519241B2

(12) United States Patent
Jargalsaikhan et al.

(10) Patent No.: US 12,519,241 B2
(45) Date of Patent: Jan. 6, 2026

(54) LOW-BAND RADIATOR AND MULTI-BROADBAND ANTENNA COMPRISING SAME

(71) Applicant: ACE TECHNOLOGIES CORPORATION, Incheon (KR)

(72) Inventors: Nyambayar Jargalsaikhan, Incheon (KR); Ho-Yong Kim, Incheon (KR); Jeong Geun Park, Daejeon (KR); Kwang Woo Park, Siheung-si (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 211 days.

(21) Appl. No.: 18/555,794

(22) PCT Filed: Apr. 12, 2022

(86) PCT No.: PCT/KR2022/005257
§ 371 (c)(1),
(2) Date: Mar. 14, 2024

(87) PCT Pub. No.: WO2022/225245
PCT Pub. Date: Oct. 27, 2022

(65) Prior Publication Data

US 2025/0286281 A1 Sep. 11, 2025

(30) Foreign Application Priority Data

Apr. 19, 2021 (KR) ........................ 10-2021-0050265

(51) Int. Cl.
*H01Q 9/28* (2006.01)
*H01Q 5/49* (2015.01)
(Continued)

(52) U.S. Cl.
CPC ............... *H01Q 9/285* (2013.01); *H01Q 5/49* (2015.01); *H01Q 7/00* (2013.01); *H01Q 21/26* (2013.01)

(58) Field of Classification Search
CPC ............ H01Q 5/49; H01Q 7/00; H01Q 9/285; H01Q 21/26
See application file for complete search history.

(56) References Cited

U.S. PATENT DOCUMENTS 8,872,717 B2 10/2014 Gunnels
2017/0062940 A1 3/2017 Cao
(Continued)

FOREIGN PATENT DOCUMENTS

CN 104821439 A * 8/2015 ............ H01Q 21/26
CN 110994147 A 4/2020
(Continued)

OTHER PUBLICATIONS

International Search Report issued from PCT International Application No. PCT/KR2022/005257 issued on Jul. 19, 2022.
(Continued)

*Primary Examiner* — Hoang V Nguyen

(57) ABSTRACT

A low-band radiator comprises: a radiation substrate; a first dipole radiation portion formed from a conductor line on one surface of the radiation substrate and comprising two first loop arms each having the length extending in a predetermined first direction and formed in a loop shape having one end open; a second dipole radiation portion formed from a conductor line on one surface of the radiation surface, comprising two second loop arms each having the length extending in a predetermined second direction and formed in a loop shape having one end open, and disposed so as to intersect the first dipole radiation portion; and a balun portion coupled to the other surface of the radiation substrate and applying power feeding signals, respectively corre-
(Continued)

sponding to the first and second loop arms, to two open ends of the loops.

14 Claims, 9 Drawing Sheets

(51) Int. Cl.
*H01Q 7/00* (2006.01)
*H01Q 21/26* (2006.01)

(56) References Cited

U.S. PATENT DOCUMENTS

2020/0127389 A1* 4/2020 Li ........................ H01Q 25/001
2020/0373668 A1* 11/2020 Wu ........................ H01Q 9/285

FOREIGN PATENT DOCUMENTS

KR 10-2012-0098353 A 9/2012
KR 10-1615751 B1 4/2016
WO 2019-084232 A1 5/2019

OTHER PUBLICATIONS

Written Opinion of the International Searching Authoriity of PCT/KR2022/005257 issued on Jul. 19, 2022.

* cited by examiner

LOW-BAND RADIATOR AND MULTI-BROADBAND ANTENNA COMPRISING SAME

CROSS-REFERENCE TO RELATED APPLICATIONS

This application is a National Stage Entry of PCT International Application No. PCT/KR2022/005257, which was filed on Apr. 12, 2022, and which claims priority from and the benefit of Korean Patent Application No. 10-2021-0050265, filed with the Korean Intellectual Property Office on Apr. 19, 2021, which is hereby incorporated by reference in its entirety.

TECHNICAL FIELD

The present disclosure relates to a low-band radiator and a multi-broadband antenna comprising the same, and more particularly, to a low-band radiator that minimizes the impact on other band radiators and can be manufactured in a compact size, and a multi-broadband antenna comprising the same.

DESCRIPTION OF THE RELATED ART

Due to the demand for various wireless communication services and the demand for high-speed, high-capacity data communication, wireless communication systems such as base stations are required to cover multiple frequency bands and have broadband characteristics. However, it is very inefficient from a cost and system operation perspective to cover multiple bands by equipping the base station with a plurality of antennas that only cover a single band for this purpose. Accordingly, there is an increasing demand for a multi-broadband antenna that can simultaneously satisfy multiple bands and broadband by arranging a plurality of radiators of radiators of different types covering different frequency bands together in a single housing (radome).

However, one of the major difficulties in developing multi-broadband antennas is that the width of the antenna radome is limited by the influence of external environments such as wind pressure. In detail, as a plurality of radiators of different types are arranged overlapped to cover different bands within a limited and narrow space, interference between radiators cannot be avoided. In particular, the problem that a low-band radiator placed close to a high-band radiator interferes with the high-band radiator and severely distorts the radiation pattern of the high-band radiator is a major difficulty that is inevitably encountered during development.

One proposed solution to this problem is to miniaturize the physical size of the low-band radiator, minimize the overlap area with the high-band radiator, and improve the isolation between the low-band radiator and the high-band radiator.

DISCLOSURE OF INVENTION

Technical Problem

An object of the present disclosure is to provide a low-band radiator that can be manufactured in a small size, and a multi-broadband antenna comprising the same.

Another object of the present disclosure is to provide a low-band radiator that has improved isolation from a high-band radiator and can minimize the influence on the radiation pattern of the high-band radiator, and a multi-broadband antenna comprising the same.

Solution to Problem

A low-band radiator according to an embodiment of the present disclosure, conceived to achieve the objectives above, comprises: a radiation substrate; a first dipole radiation portion formed from a conductor line on one surface of the radiation substrate and comprising two first loop arms each having the length extending in a predetermined first direction and formed in a loop shape having one end open; a second dipole radiation portion formed from a conductor line on one surface of the radiation substrate, comprising two second loop arms each having the length extending in a predetermined second direction and formed in a loop shape having one end open, and disposed so as to intersect the first dipole radiation portion; and a balun portion coupled to the other surface of the radiation substrate and applying power feeding signals, respectively corresponding to the first and second loop arms, to two open ends of the loops.

Each of the first loop arms and the second loop arms may have at least one meander line formed in the inner direction of the loop at a predetermined position of the loop-shaped conductor line.

The low-band radiator may further include a parasitic patch formed on the other surface of the radiation substrate at a position that overlaps a predetermined meander line among at least one meander line of each of the first loop arms and the second loop arms.

Each of the first loop arms and the second loop arms may further have at least one stub formed in an inner direction of the loop at a predetermined position of the loop-shaped conductor line.

The radiation substrate may be formed in a shape corresponding to the outer shapes of the two first loop arms and the two second loop arms of the first and second dipole radiation portions.

The radiation substrate may have a smaller size than the first and second dipole radiation portions, and each of one first loop arm of the two first loop arms and one second loop arm of the two second loop arms may be formed in the form of a loop with the other side cut at a side end of the radiation substrate, and further include a bending line that connects both ends of the cut loop to each other with a predetermined length to maintain the loop structure of the loop arm, wherein the bending line may be bent toward the other surface of the radiation substrate at the side end of the radiation substrate.

The balun portion may include four pairs of feed pads that receive power feeding signals for each of the two first loop arms and each of the two second loop arms and feed the power feeding signals to the corresponding loop arms, and two feed pads from each of the four pairs of feed pads may feed the same power feeding signals to both open ends of the corresponding loop arm.

The balun portion may include: a first dipole feeding portion including two first feeding portions arranged in parallel with each other and each having an upper end coupled to the radiation substrate to apply power feeding signals respectively corresponding to the two first loop arms and a first coupling bar connected between the two first feeding portions and transmitting power feeding signals applied to one of the two first feeding portions to the remaining first feeding portion; and a second dipole feeding portion including two second feeding portions arranged in parallel with each other and each having an upper end coupled to the radiation substrate to apply power feeding signals respectively corresponding to the two second loop arms and a second coupling bar connected between the two second feeding portions and transmitting power feeding signals applied to one of the two second feeding portions to the remaining second feeding portion.

A first − feeding portion among the two first feeding portions may include: a first − feed substrate whose upper end penetrates the radiation substrate and is coupled at a position corresponding to a first − loop arm of the two first loop arms; a first − feed line formed on the lower side of one surface of the first − feed substrate in the direction of the first − loop arm and impedance matching and transmitting a first power feeding signal applied to the first coupling bar connected through the feed substrate; a first − ground plane formed on the other surface of the first − feed substrate so as not to be electrically connected to the first coupling bar penetrating the first − feed substrate; and a pair of first − feed pads formed on an upper side of one surface of the first − feed substrate and spaced apart from the first − feed line and coupled to the first-ground plane, electrically connected to both ends of the open loop of the first − loop arm, respectively, to − feed the first power feeding signal to the first − loop arm.

A first + feeding portion among the two first feeding portions may include: a first + feed substrate whose upper end penetrates the radiation substrate and is coupled at a position corresponding to a first + loop arm of the two first loop arms; a first + feed line formed on the lower side of one surface of the first + feed substrate in the direction of the first + loop arm and impedance matching the first power feeding signal transmitted through the first coupling bar; a first + ground plane formed on the other surface of the first + feed substrate so as not to be electrically connected to the first coupling bar penetrating the first + feed substrate; and a pair of first + feed pads formed on an upper side of one surface of the first + feed substrate and spaced apart from the first + feed line and coupled to the first + ground plane, electrically connected to both ends of the open loop of the first + loop arm, respectively, to + feed the first power feeding signal to the first + loop arm.

A second − feeding portion among the two second feeding portions may include: a second − feed substrate whose upper end penetrates the radiation substrate and is coupled at a position corresponding to a second − loop arm of the two second loop arms; a second − feed line formed on the lower side of one surface of the second − feed substrate in the direction of the second − loop arm and impedance matching and transmitting a second power feeding signal applied to the second coupling bar connected through the feed substrate; a second − ground plane formed on the other surface of the second − feed substrate so as not to be electrically connected to the second coupling bar penetrating the second − feed substrate; and a pair of second − feed pads formed on an upper side of one surface of the second − feed substrate and spaced apart from the second − feed line and coupled to the second − ground plane, electrically connected to both ends of the open loop of the second − loop arm, respectively, to − feed the second power feeding signal to the second − loop arm.

A second + feeding portion among the two second feeding portions may include: a second + feed substrate whose upper end penetrates the radiation substrate and is coupled at a position corresponding to a second + loop arm of the two second loop arms; a second + feed line formed on the lower side of one surface of the second + feed substrate in the direction of the second + loop arm and impedance matching the second power feeding signal transmitted through the second coupling bar; a second + ground plane formed on the other surface of the second + feed substrate so as not to be electrically connected to the second coupling bar penetrating the second + feed substrate; and a pair of second + feed pads formed on an upper side of one surface of the second + feed substrate and spaced apart from the second + feed line and coupled to the second + ground plane, electrically connected to both ends of the open loop of the second + loop arm, respectively, to + feed the second power feeding signal to the second + loop arm.

A multi-broadband antenna according to another embodiment of the present disclosure, conceived to achieve the objectives above, comprises: a reflector; a plurality of high-band radiators arranged in the direction of one surface of the reflector; and a plurality of low-band radiators arranged to be spaced apart from the high-band radiators at a predetermined interval in the direction of one surface of the reflector, wherein each of the plurality of low-band radiators comprises: a radiation substrate; a first dipole radiation portion formed from a conductor line on one surface of the radiation substrate and comprising two first loop arms each having the length extending in a predetermined first direction and formed in a loop shape with a partially open structure; a second dipole radiation portion formed from a conductor line on one surface of the radiation substrate, comprising two second loop arms each having the length extending in a predetermined second direction and formed in a loop shape with a partially open structure, and disposed so as to intersect the first dipole radiation portion; and a balun portion coupled between the reflector and the other surface of the radiation substrate, supporting the radiation substrate, and applying power feeding signals, corresponding to each of the first and second loop arms, to two open ends of the loops.

Advantageous Effects

Accordingly, the low-band radiator and the multi-broadband antenna comprising the same according to an embodiment of the present disclosure have improved isolation between the low-band radiator and the high-band radiator, can minimize the influence of the low-band radiator on the radiation pattern of the high-band radiator, and can be manufactured in a compact size.

DETAILED DESCRIPTION OF THE INVENTION

Figure 1:
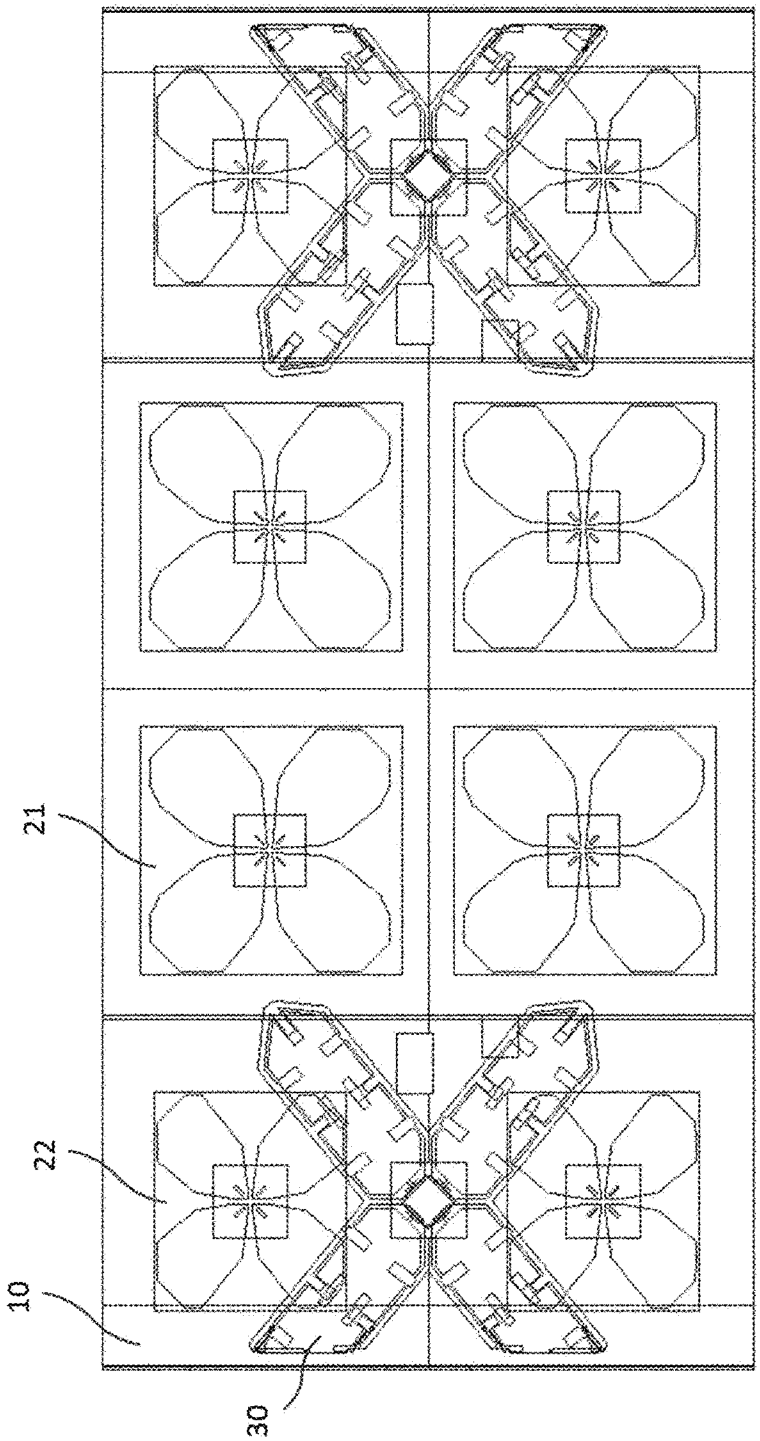
FIG. 1 shows a top view of a multi-broadband antenna according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

FIG. 1 shows a top view of a multi-broadband antenna according to an embodiment of the present disclosure.

Referring to FIG. 1, the multi-broadband antenna according to the illustrated exemplary embodiment comprises a reflector 10, a plurality of high-band radiators 21 and 22 for radiating relatively high-band RF signals to realize multi-broadband, and a plurality of low-band radiators 30 for radiating relatively low-band RF signals.

The plurality of high-band radiators 21 and 22 and the plurality of low-band radiators 30 may be arranged to be spaced apart from one surface of the reflector 10 by a different predetermined distance. In this case, the plurality of low-band radiators 30 may be arranged to be spaced further apart from the reflector 10 than the plurality of high-band radiators 21 and 22. That is, the plurality of low-band radiators 30 may be arranged at a greater distance from the reflector 10 than the plurality of high-band radiators 21 and 22.

In addition, the plurality of high-band radiators 21 and 22 and the plurality of low-band radiators 30 may be arranged according to a predetermined pattern. Here, as an example, it is shown that eight high-band radiators 21 and 22 are arranged in a 2×4 array and two low-band radiators are arranged in a 1×2 array, however, the number and arrangement pattern of the high-band radiators 21 and 22 and low-band radiators 30 may be changed in various ways.

In addition, as the plurality of high-band radiators 21 and 22 and the plurality of low-band radiators 30 are arranged to be spaced apart from the reflector 10 at different heights, the plurality of high-band radiators 21 and 22 and the plurality of low-band radiators 30 may be arranged so that some areas overlap with each other in the vertical direction of the reflector 10.

Here, in the case of the high-band radiators 22 having an area overlapping with the arrangement area of the low-band radiators 30 among the plurality of high-band radiators 21 and 22, they may be formed to be smaller than the remaining high-band radiators 21 so that the size of the overlapping area is small. That is, the plurality of high-band radiators 21 and 22 may have different sizes. This is to reduce the influence of the low-band radiators 30 disposed at a position having the overlapping area on the radiation pattern of the high-band radiators 22, but is not essential.

Meanwhile, it will be described assuming that, in the multi-broadband antenna of the present disclosure, both the high-band radiators and the low-band radiators are dual polarized dipole radiators that radiate dual polarization of +45 degrees and −45 degrees. Accordingly, each of the plurality of high-band radiators 21 and 22 may be configured so that four radiation patches are formed to extend perpendicularly to each other to radiate dual polarized waves. However, this is just an example, and the structure of the plurality of high-band radiators 21 and 22 may be changed in various ways depending on required characteristics.

The plurality of low-band radiators 30 are spaced a greater distance from the reflector 10 than the high-band radiators 21 and 22, disposed in the radiation direction of the high-band radiators 21, and formed to be relatively large in size compared to the high-band radiators 21 and 22 so that they can radiate low-band RF signals. Therefore, the low-band radiators 30 may become a physical obstacle to the radiation pattern of the high-band radiator 21 and 22, and as a result, the radiation pattern of the high-band radiators is influenced by the shape and structure of the low-band radiators 30.

Although, as described above, the influence on the radiation pattern can be partially reduced by reducing the overlapping area with the low-band radiators 30 by forming some high-band radiators 22 to be smaller than other high-band radiators 21, it is realistically very difficult to remove the overlapping area while maintaining the required characteristics of the high-band radiators 21 and 22 and the low-band radiators 30, due to limitations in the size of the antenna.

Accordingly, in the present disclosure, in order to reduce the influence of the low-band radiators 30 on the radiation pattern of the high-band radiators 21 and 22 in a limited space, the low-band radiators 30 include a plurality of loop arms in which a conductive line forms a loop rather than a radiation patch having a planar structure. That is, the low-band radiator 30 is configured to include a loop arm with a linear structure rather than a radiation patch with a planar structure, thereby greatly reducing the area influencing the radiation pattern of the high-band radiators 21 and 22, and thus the high-band radiators 21 and 22 can maintain its radiation characteristics as much as possible.

In addition, in this embodiment, the low-band radiators 30 are configured to further have a meander line or stub on the loop arm, so that the length resonance component due to miniaturization can be compensated, thereby reducing the size of the low-band radiators 30.

Hereinafter, the detailed structure of the low-band radiator will be described with reference to the drawings.

Figure 2:
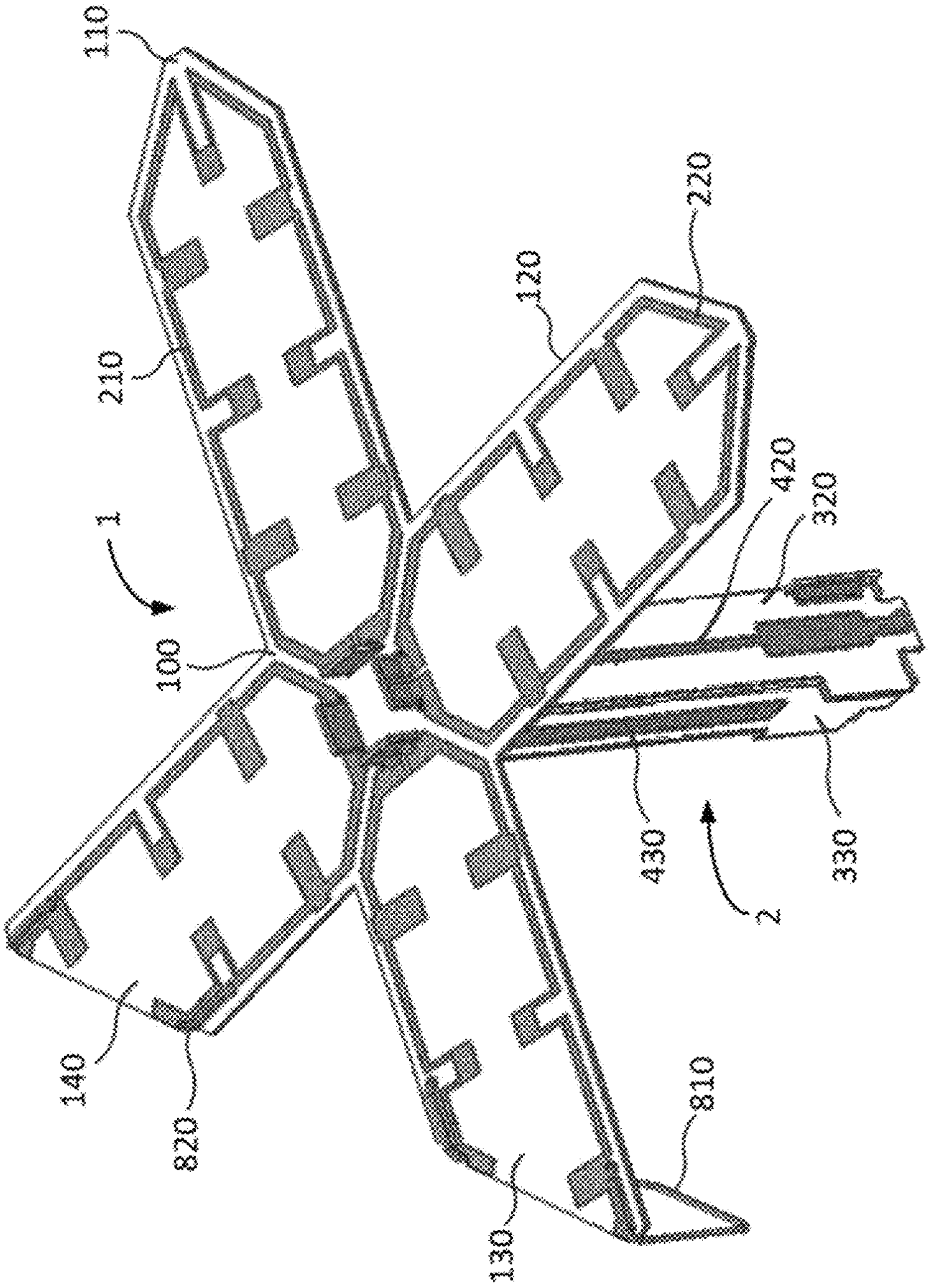
FIG. 2 shows a perspective view of a low-band radiator according to an embodiment of the present disclosure.
Figure 3:
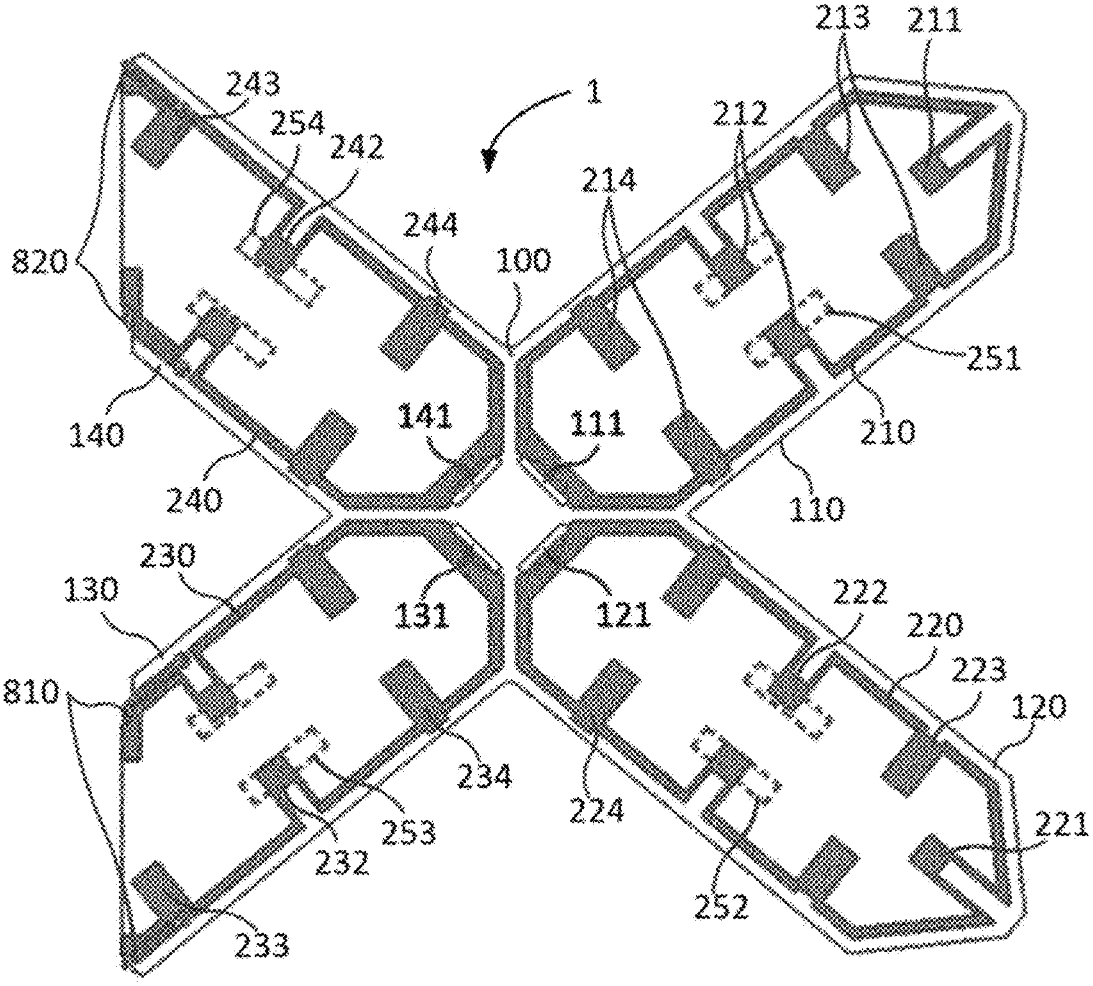
FIGS. 3 and 4 show top and bottom views of the radiation portion of FIG. 2.
Figure 4:
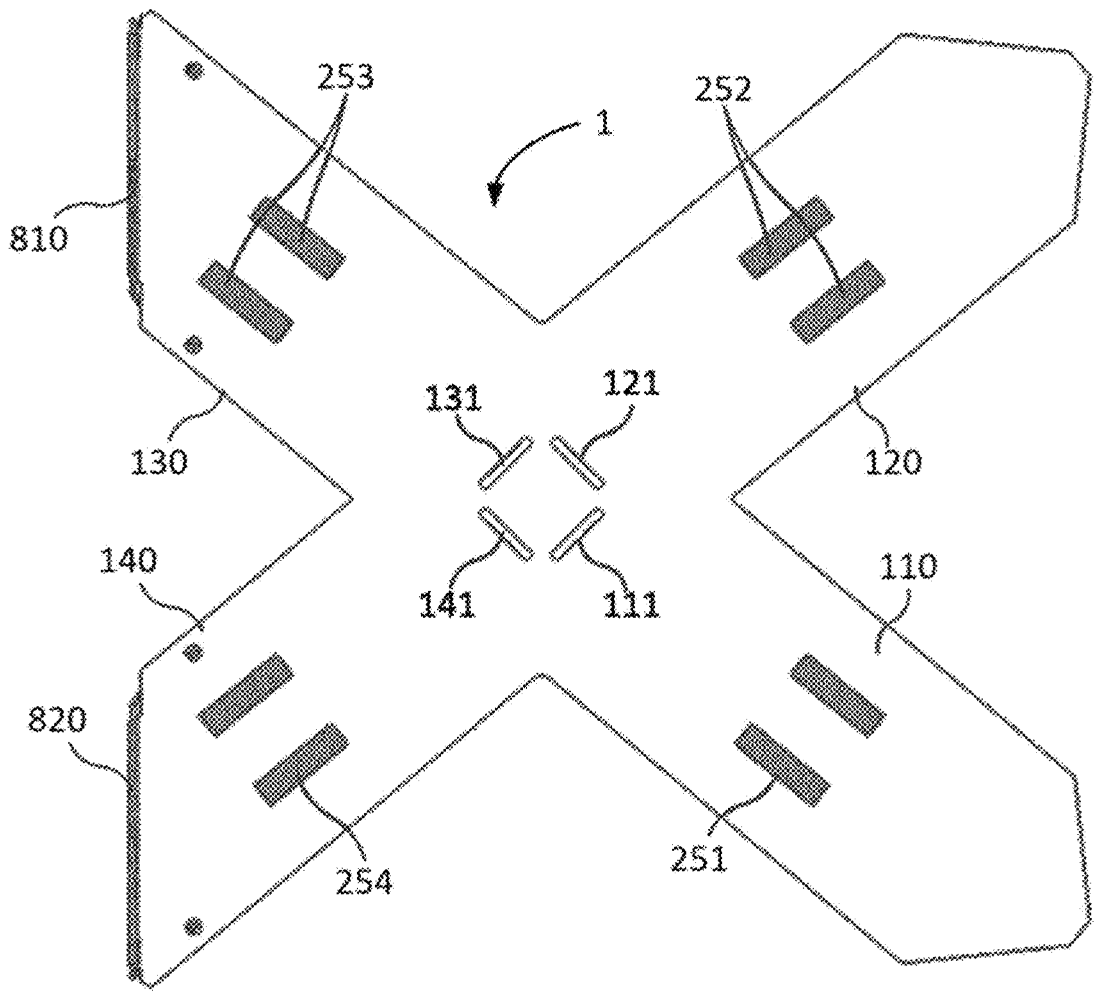
Figure 5:
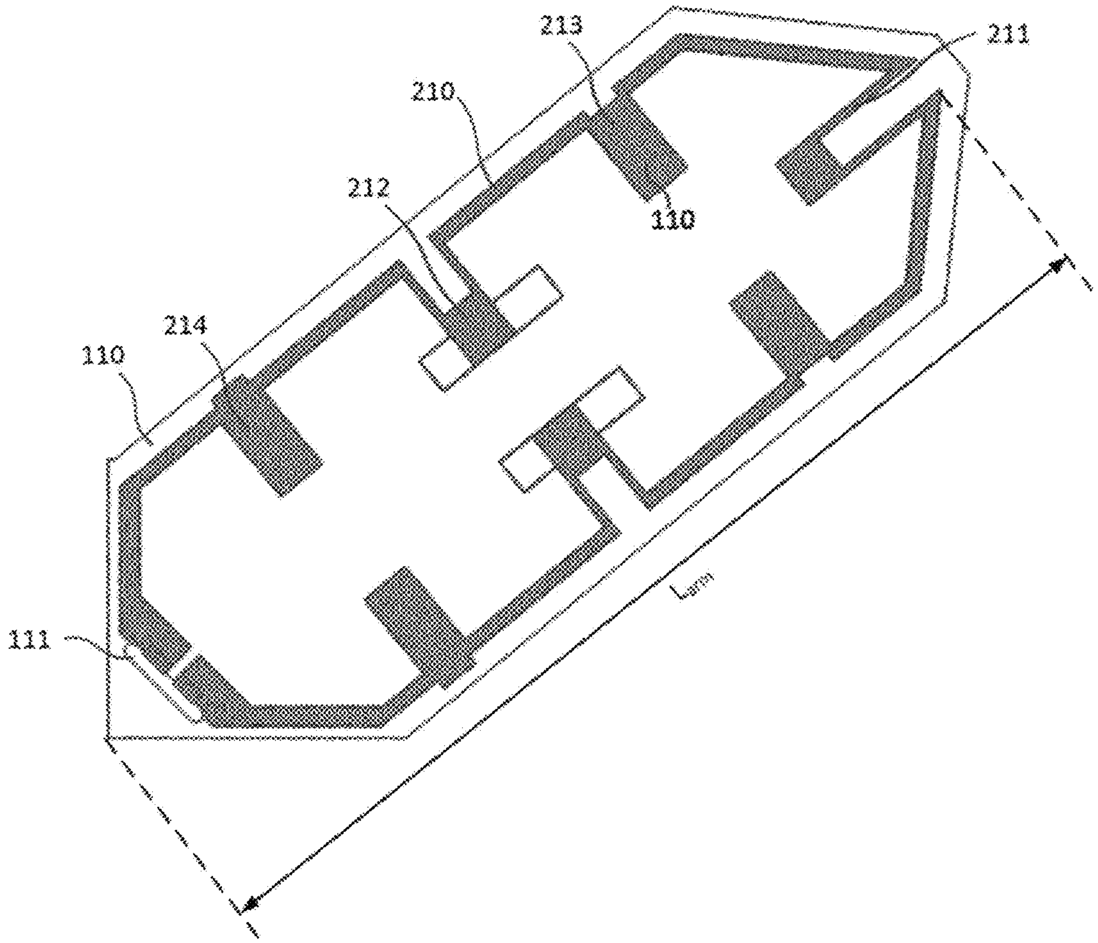
FIG. 5 is a diagram for explaining the detailed structure of the first loop arm of FIG. 3.
Figure 6:
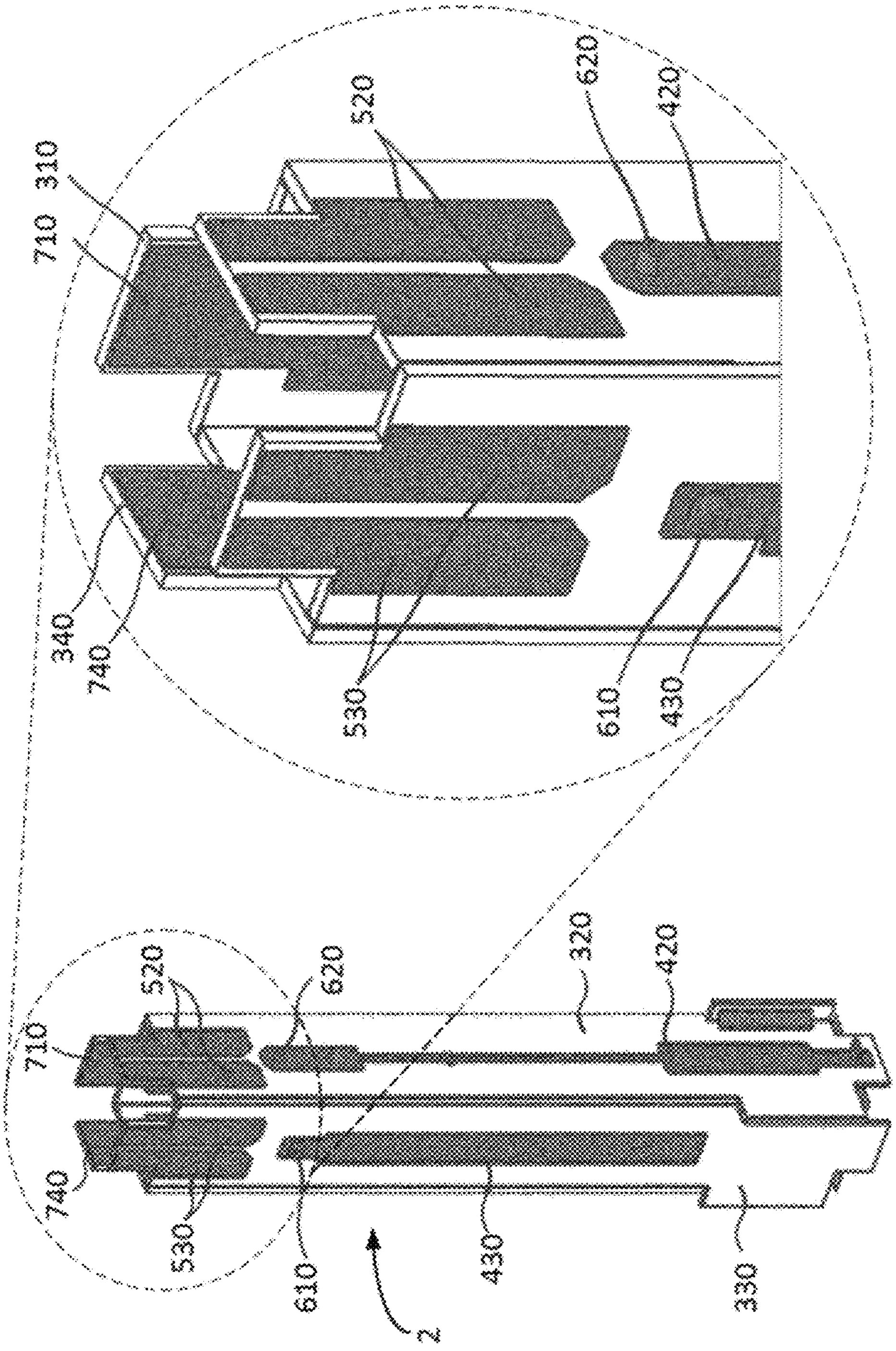
FIGS. 6 and 7 show a perspective view and a top view of the balun portion of FIG. 2.
Figure 7:
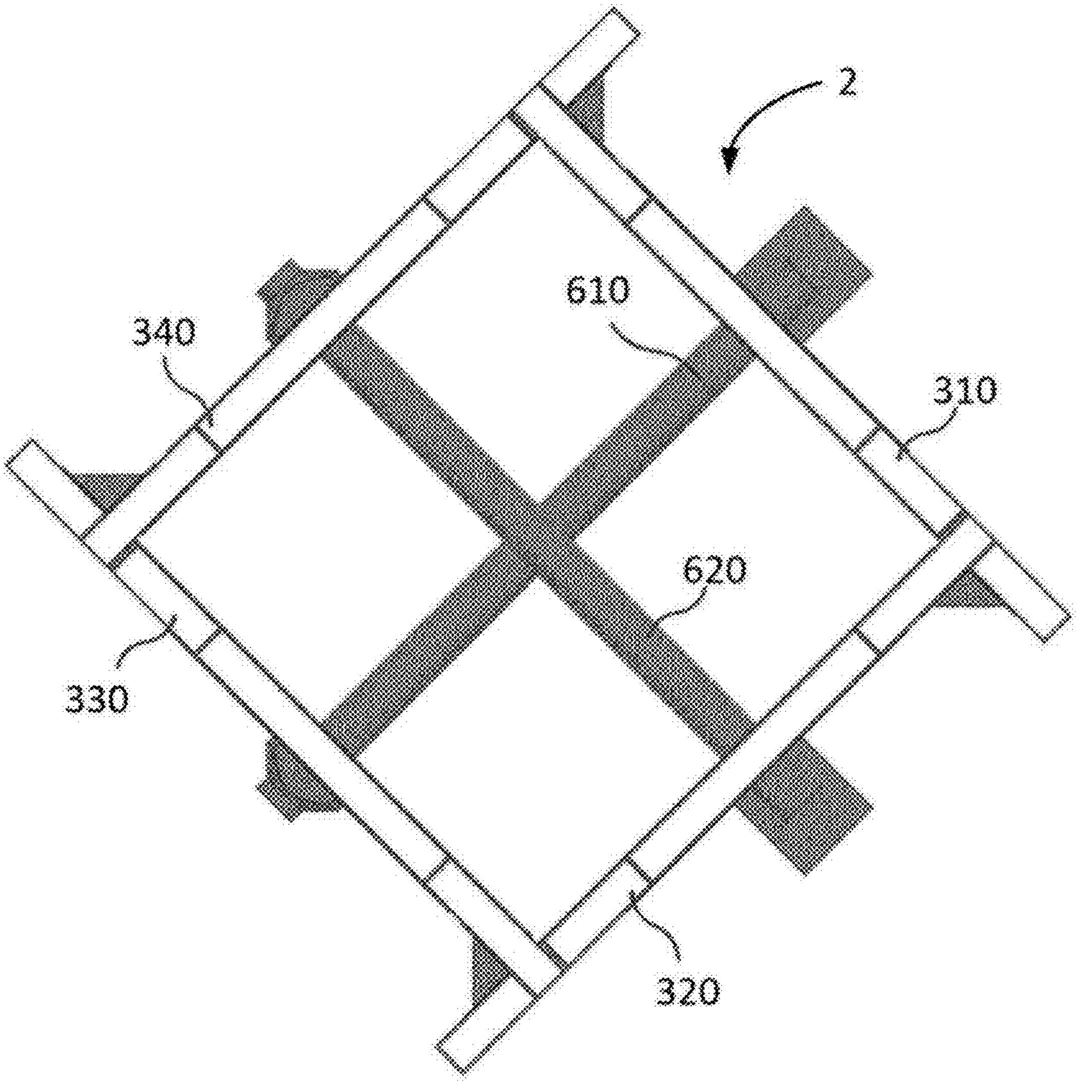
Figure 8:
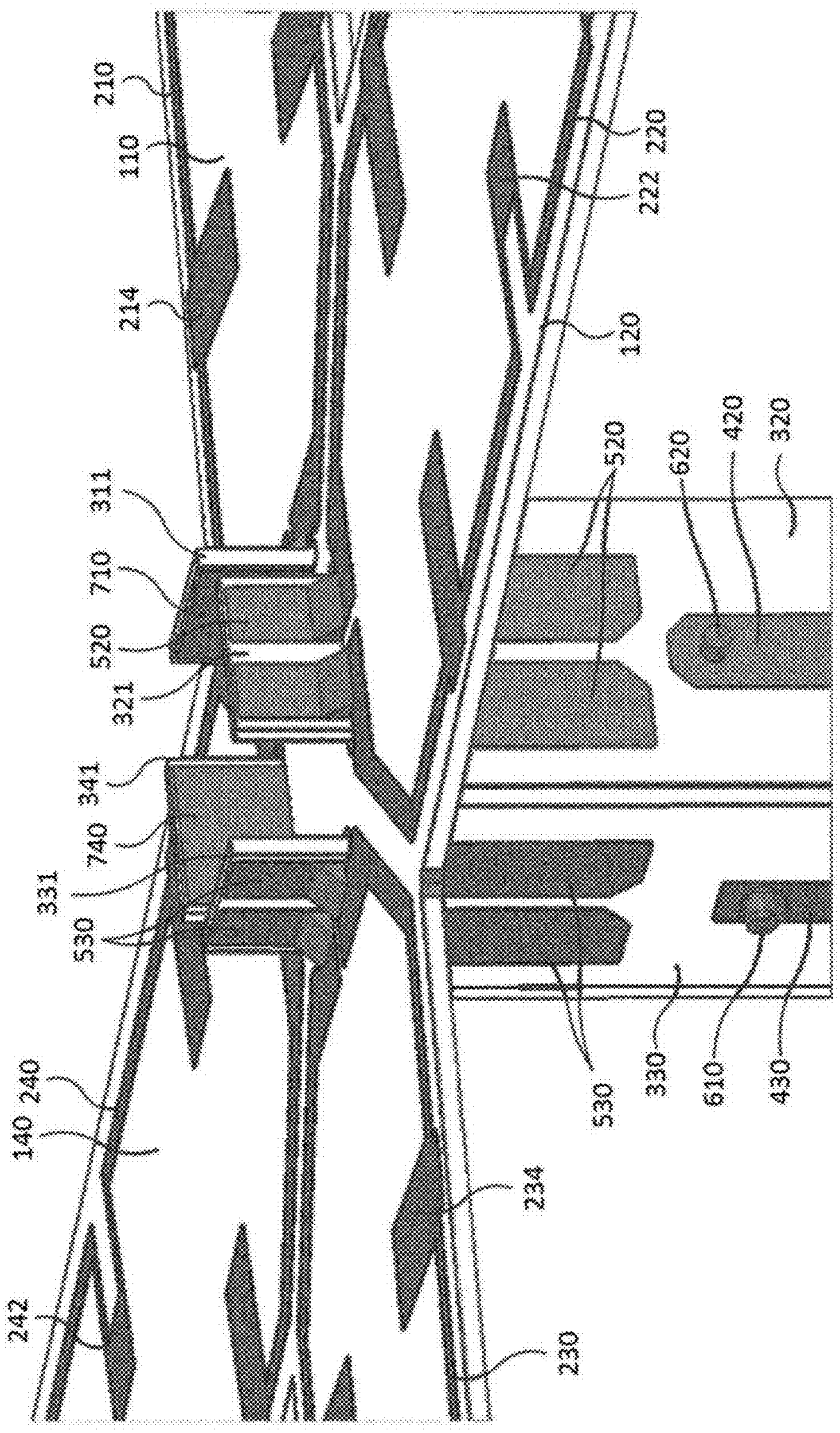
FIGS. 8 and 9 are diagrams for explaining the combined structure of the radiation portion and the balun portion.
Figure 9:
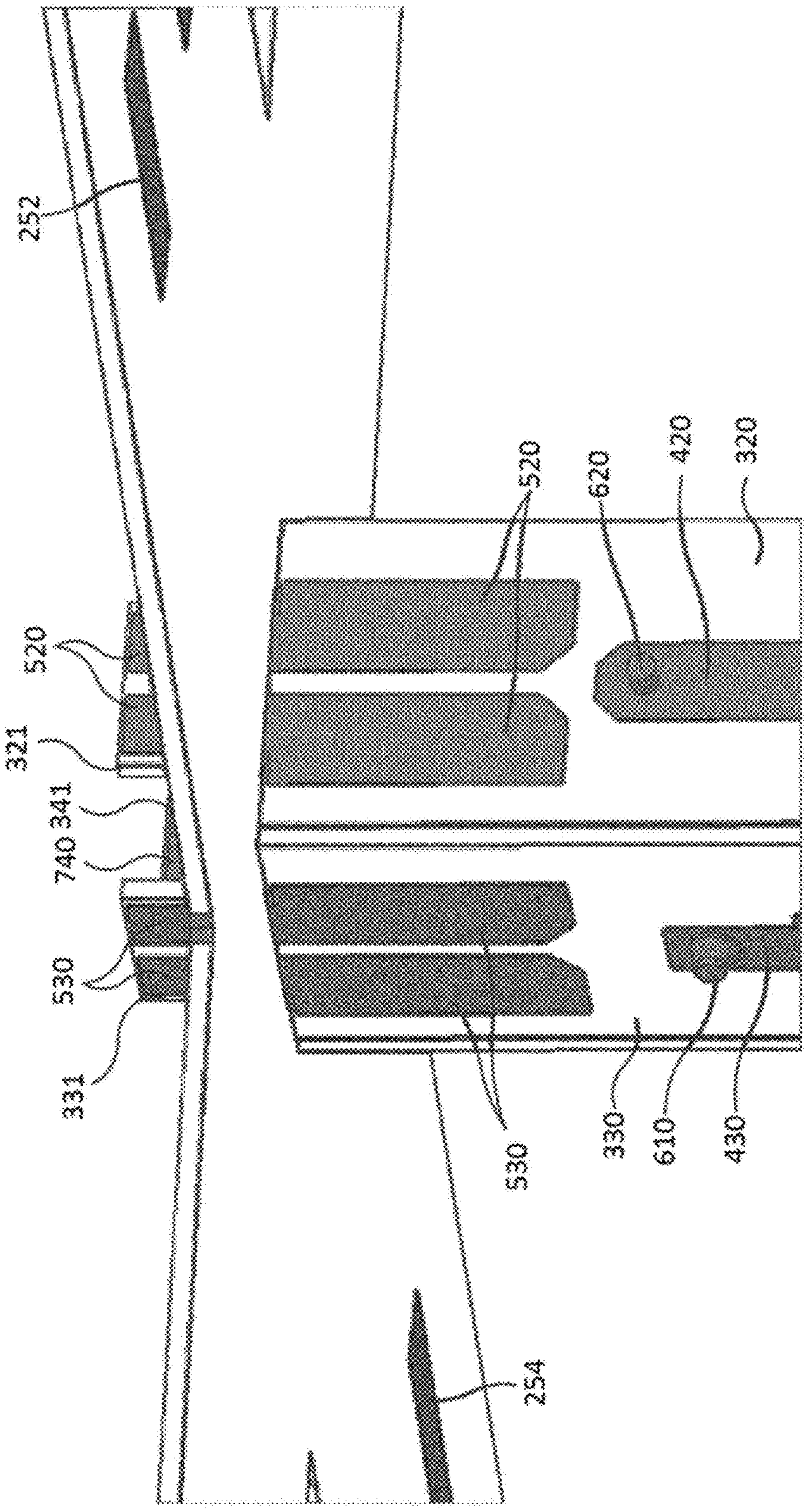

FIG. 2 shows a perspective view of a low-band radiator according to an embodiment of the present disclosure, FIGS. 3 and 4 show top and bottom views of the radiation portion of FIG. 2, and FIG. 5 is a diagram for explaining the detailed structure of the first loop arm of FIG. 3. In addition, FIGS. 6 and 7 show a perspective view and a top view of the balun portion of FIG. 2, and FIGS. 8 and 9 are diagrams for explaining the combined structure of the radiation portion and the balun portion.

Referring to FIGS. 2 to 9, the low-band radiator 30 according to this embodiment may be largely composed of a radiation portion 1 and a balun portion 2, and the radiation portion 1 may include a radiation substrate 100 and four loop arms 210, 220, 230, and 240, which are radiation patterns formed on one surface of the radiation substrate 100.

In the present disclosure, each of the four loop arms 210, 220, 230, and 240 is formed as a loop-shaped conductive line whose length is extended in a predetermined direction on one surface of the radiation substrate. Each of the four loop arms 210, 220, 230, and 240 may be formed as a loop of a predetermined shape, and here, as an example, it is shown as being formed in the form of a hexagonal loop whose length is extended in the first and second directions. Among the four loop arms 210, 220, 230, and 240, two first loop arms 210 and 230 arranged in line with their lengths extended in the same first direction constitute a first dipole radiation portion, and two second loop arms 220 and 240 arranged in line with their length extended in the second direction constitute a second dipole radiation portion arranged to intersect the first dipole radiation portion. That is, the first dipole radiation portion and the second dipole radiation portion may be arranged to intersect each other to have an X-shaped pattern.

Meanwhile, each of the four loop arms 210, 220, 230, and 240 may have a structure in which one side is partially open in the direction where the first dipole radiation portion and the second dipole radiation portion intersect. Here, the same power feeding signals are fed to both open ends of the loop. As an example, among the two first loop arms 210 and 230 of the first dipole radiation portion, the first − loop arm 210 may receive − power at both open ends, and the first + loop arm 230 may receive + power at both open ends, thereby radiating RF signals of +45 degree polarization among dual polarizations, and among the two second loop arms 220 and 240 of the second dipole radiation portion, the second − loop arm 220 may receive − power at both open ends, and the second + loop arm 240 may receive + power at both open ends, thereby radiating RF signals of −45 degree polarization among dual polarizations.

As such, in the present disclosure, each of the first and second dipole radiation portions of the radiation portion 1 is provided with two loop arms 210 and 230; or 220 and 240 formed of thin conductive lines instead of a radiation patch having a conductive plate structure, so that the influence on the radiation pattern of the RF signals radiated from the high-band radiators 21 and 22 can be significantly reduced. In particular, even though the low-band radiators 30 are placed in the radiation direction of the high-band radiators 21 and 22, the RF signals radiated from the high-band radiators 21 and 22 can also penetrate and radiate inside the loops of the loop arms 210, 220, 230, and 240, so that the radiation pattern of the high-band radiators 21 and 22 can be maintained as much as possible.

The radiation substrate 100 is a dielectric substrate supported by a balun portion 2 coupled to a predetermined position on the other surface, spaced apart from the reflector 10 by a predetermined distance, and arranged in parallel with the reflector 10. In this embodiment, the radiation substrate 100 may be formed in an X shape corresponding to the pattern formed by the four loop arms 210, 220, 230, and 240 of the first and second dipole radiation portions arranged to intersect each other. That is, the radiation substrate 100 may be formed in a shape corresponding to the outer shape of the four loop arms 210, 220, 230, and 240.

The radiation substrate 100 may be formed in a square shape like the substrates of the high-band radiators 21 and 22, but in this embodiment, the radiation substrate 100 may be formed in a pattern extending in an X shape from the center according to the formation pattern of the four loop arms 210, 220, 230, and 240, thereby reducing the size of the low-band radiators. That is, the radiation substrate 100 may include four substrate arms 110, 120, 130, and 140 respectively corresponding to the four loop arms 210, 220, 230, and 240. Here, the four substrate arms 110, 120, 130, and 140 each have a shape corresponding to the outer shape of the corresponding loop arm among the four loop arms 210, 220, 230, and 240.

In each of the four substrate arms 110, 120, 130, and 140, a balun coupling slot 111, 121, 131, and 141 is formed at both ends of one side open in the loop of the loop arm 210, 220, 230, and 240, so that the upper end of the balun portion 2 can be inserted through.

When one end of the balun portion 2 is inserted through the radiation substrate 100, the feed pads 520 and 530 of the balun portion 2 are respectively connected to both ends of the open sides of the corresponding loop arms 210, 220, 230, and 240, and apply the corresponding power feeding signals to each loop arm. Here, each loop arm 210, 220, 230, and 240 of the balun portion 2 is provided with two corresponding feed pads 520 and 530, so that power feeding signals can be individually fed to both ends of the open loops of the four loop arms 210, 220, 230, and 240. That is, the balun portion 2 is provided with pairs of feed pads 520 and 530 that feed power feeding signals to each of the four loop arms 210, 220, 230, and 240. Each pair of the feed pads 520 and 530 feeds the same power feeding signals to both ends of the open loop of the corresponding loop arm 210, 220, 230, and 240.

In this embodiment, at least one meander line 211 or 221; and 212, 222, 232, or 242, or at least one stub 213, 223, 233, or 243; and 214, 224, 234, or 244 may be further formed on each of the four loop arms 210, 220, 230, and 240. As described above, multi-broadband antennas are frequently limited in physical size, and this physical size limitation is an even greater constraint on the low-band radiator 30, which has a relatively larger size than the high-band radiators 21 and 22. Therefore, in order to manufacture a multi-broadband antenna in a limited space, it is important to reduce the physical size of the low-band radiator 30.

In order to reduce the physical size of the low-band radiator 30, the size occupied by the four loop arms 210, 220, 230, and 240 must be reduced. Accordingly, in the present disclosure, at least one meander line 211 or 221; and 212, 222, 232, or 242 may be formed on each of the four loop arms 210, 220, 230, and 240 so that each of the four loop arms 210, 220, 230, and 240 has a length capable of resonating with RF signals of a required frequency within a limited size. That is, at least one meander line 211 or 221; and 212, 222, 232, or 242 can increase the length of the loop-shaped conductor line of each of the four loop arms 210, 220, 230, and 240 so that each loop arm 210, 220, 230, and 240 can have the required length. In this case, the meander lines 211 or 221; and 212, 222, 232, or 242 are formed in the inner direction of the loop on each of the four loop arms 210, 220, 230, and 240 to prevent the size of the low-band radiators from increasing.

Here, as an example, it was assumed that one first meander line 211 or 221 is formed on the other side of the loop arm 210, 220, 230, or 240 with one side open, and one second meander line 212, 222, 232, or 242 is formed on each of the two lines between one side and the other side of the loop, so that three meander lines 211 or 221; and 212, 222, 232, or 242 are formed on each of the four loop arms 210, 220, 230, and 240. However, the number or length of meander lines formed on each loop arm 210, 220, 230, or 240 may be set in various ways.

The at least one stub 213, 223, 233, or 243; and 214, 224, 234, or 244 formed on each of the four loop arms 210, 220, 230, and 240 is provided for broadband matching of the meander lines 211 or 221; and 212, 222, 232, or 242 having narrow-band characteristics. That is, as described above, to have a length that can resonate with RF signals of a required frequency within a limited size, the meander lines formed on each of the four loop arms 210, 220, 230, and 240 have narrow-band characteristics, and in order to make the loop arms 210, 220, 230, and 240 broadband on which these meander lines 242 are formed, they are matched using stubs 213, 223, 233, or 243; and 214, 224, 234, or 244.

The at least one stub 213, 223, 233, or 243; and 214, 224, 234, or 244 is also formed in the inner direction of the loop on each of the four loop arms 210, 220, 230, and 240 to prevent the size of the low-band radiators from increasing, and the number and size of the stubs may be adjusted in various ways. Here, as an example, it is assumed that a first stub 213, 223, 233, or 243 is formed between the first meander line 211 or 221 and the two second meander lines 212, 222, 232, or 242, respectively, and a second stub 214, 224, 234, or 244 is formed between each of the two second meander lines 212, 222, 232, or 242 and the open one end, but the present disclosure is not limited thereto.

Meanwhile, at positions corresponding to each of the four loop arms 210, 220, 230, and 240 on the other surface of the radiation substrate 100, parasitic patches 251 to 254 may be further formed to improve isolation from the high-band radiators 21 and 22. As described above, RF signals radiated from the high-band radiators may be induced in the low-band radiators and re-radiated to the high-band radiators, thereby affecting the radiation pattern of the high-band radiators. This problem can be solved by improving the isolation between the high-band radiators 21 and 22 and the low-band radiators 30. Accordingly, in the present disclosure, the parasitic patches 251 to 254 are further formed on the other surface of the radiation substrate 100. Here, for example, two parasitic patches 251 to 254 may be formed on each of the four substrate arms 110, 120, 130, and 140, and in particular, may be formed on the other surface at the position where the meander lines (here, as an example, the second meander lines 212, 222, 232, and 242) of the corresponding four loop arms 210, 220, 230, and 240 are formed.

Referring to FIG. 5, when the operating frequency bands of the low-band radiator 30 and the high-band radiator 21 and 22 according to this embodiment are 0.694 GHz to 0.96 GHz and 1.427 GHz to 2.7 GHZ, respectively, the axial length ($L_{arm}$) for each loop arm of the low-band radiator is approximately 0.185λ to 0.256λ. The total length of the low-band radiator is 0.427λ± 0.06λ, which is about 16% smaller than the size of the existing half-wave low-band element.

In some cases, due to size limitations of the multi-broadband antenna, the radiation substrate 100 cannot have a size corresponding to the first and second dipole radiation portions. As described above, the two loop arms 210 and 230; or 220 and 240 of each of the first and second dipole radiation portions must be arranged in line in the same direction, but the size of the multi-broadband antenna may be limited to be smaller than the length of the two loop arms 210 and 230; or 220 and 240 arranged in line. Nevertheless, there is a limit to the size of the loop arms 210, 220, 230, and 240 that can be reduced by forming more meander lines or stubs.

In this case, as shown in FIGS. 2 to 4, among the four substrate arms 110, 120, 130, and 140 of the radiation substrate 100, two substrate arms 130 and 140 cannot be formed to have a length corresponding to the loop arm. In addition, when the two substrate arms 130 and 140 are not formed to have the required length for the corresponding loop arms 230 and 240, the loop arms 230 and 240 formed on one surface of the corresponding substrate arms 130 and 140 also do not maintain an intact loop structure, and are formed in the form of a loop in which the other side in the opposite direction to the open one side is cut at the side ends of the substrate arms 130 and 140. That is, a loop is not formed, and as a result, the first and second dipole radiation portions cannot radiate RF signals normally.

Accordingly, the low-band radiator 30 of the present disclosure may further include bending lines 810 and 820 that are implemented as conductors with a predetermined length and are connected to both ends of the other side of the cut loop of the loop arms 230 and 240, allowing the connected loop arms 230 and 240 to maintain the loop structure. That is, when the size of the substrate arms 110, 120, 130, and 140 of the radiation substrate 100 is smaller than the size of the corresponding loop arms 210, 220, 230, and 240 due to physical size limitations, the bending lines 810 and 820 are connected to the corresponding loop arms 210, 220, 230, and 240, respectively, so that a loop structure larger than the substrate arms 110, 120, 130, and 140 can be maintained. Here, if the bending lines 810 and 820 are formed to extend directly in the expansion direction of the loop arms 210, 220, 230, and 240, the size of the multi-broadband antenna cannot be miniaturized. Therefore, the bending lines 810 and 820 are bent at the side ends of the substrate arms 130 and 140 in the direction of the other surface of the radiation substrate, that is, toward the reflector, so that the bending lines 810 and 820 do not affect the size of the multi-broadband antenna.

Meanwhile, the balun portion 2 is coupled between the radiation portion 1 and the reflector 10, functions as a support to ensure that the radiation portion 1 is placed at a predetermined height on one surface of the reflector 10, and performs a power feeding function of applying power feeding signals to the radiation portion 1.

The balun portion 2 is vertically coupled to the reflector 10 and the radiation portion 1 arranged in parallel with each other, and supports the radiation portion 1 so that the radiation portion 1 is arranged in parallel and spaced apart from each of the reflector 10 and the high-band radiators 21 and 22 by a predetermined distance. In addition, the balun portion 2 may include a first dipole feeding portion that applies +45 degree power feeding signals to the first dipole radiation portion and a second dipole feeding portion that applies −45 degree power feeding signals to the second dipole radiation portion.

The first dipole feeding portion − feeds +45 power feeding signals to both open ends of the first − loop arm 210 of the first dipole radiation portion, and + feeds +45 power feeding signals to both open ends of the first + loop arm 230. The second dipole feeding portion − feeds −45 power feeding signals to both open ends of the second − loop arm 220 of the second dipole radiation portion, and + feeds −45 power feeding signals to both open ends of the second + loop arm 240.

The first dipole feeding portion includes a first − feeding portion and a first + feeding portion arranged in parallel with each other and each having an upper end coupled through the balun coupling slot 111 and 131 of two substrate arms 110 and 130 corresponding to the first − loop arm 210 and the first + loop arm 230 among the four substrate arms 110, 120, 130, and 140 of the radiation substrate 100, and applying power feeding signals, respectively corresponding to the two first loop arms 210 and 230, and a first coupling bar 610 connected between the first − feeding portion and the first + feeding portion and transmitting + power feeding signals applied to the first − feeding portion to the first + feeding portion.

Among the two first feeding portions, the first − feeding portion, coupled to the substrate arm 110 on which the first − loop arm 210 is formed and + feeding +45 degree power feeding signals, includes a first − feed substrate 310, a first − feed line (not shown), a first − ground plane 710, and a pair of first − feed pads (not shown).

The first − feed substrate 310 has an upper end coupled through the balun insertion slot 111 formed in the substrate arm 110. Here, the first − feed substrate 310 may be formed with a protrusion 311 whose upper part protrudes so as to limit the depth of insertion into the balun insertion slot 111. The first − feed line is formed on the lower side of one surface of the first − feed substrate 310 in the direction of the first − loop arm 210. The first − feed line has one end to which power feeding signals are applied, and the other end connected to the first coupling bar 610, formed in a predetermined pattern, and impedance matching and transmitting the applied power feeding signals to the first coupling bar 610. The first − ground plane 710 is formed on the other surface of the first − feed substrate 310, but is not electrically connected to the first coupling bar 610 penetrating the first − feed substrate 310. Here, when the first − feeding portion receives power feeding signals through, as an example, a cable, the first − feed line may be connected to the inner conductor of the cable to receive power feeding signals, and the first − ground plane 710 may be connected to the outer conductor of the cable. In addition, the pair of first − feed pads is formed on the upper side of one surface of the first − feed substrate 310, spaced apart from the first − feed line and the first coupling bar 610, and is coupled to the first − ground plane 710, to feed − power feeding signals to the first − loop arm 210.

Here, since the pair of first − feed pads consists of two separate pads electrically connected to both ends of the open loop of the first − loop arm 210, respectively, +45 degree power feeding signals can be − fed independently to both ends of the open loop of the first − loop arm 210.

As described above, − feeding through the coupling between the first − ground plane 710 and the pair of first − feed pads (not shown) is to improve the isolation between the first − loop arm 210 and the adjacent loop arms 220 and 240 and to improve the cross polarization ratio. That is, the reason why the first − feeding portion feeds power feeding signals applied to the first − feed line to both ends of the open loop of the first − loop arm 210 through coupling between the first − ground plane 710 and the pair of first − feed pads (not shown) is to improve the isolation between the first − loop arm 210 and the adjacent loop arms 220 and 240 and to improve the cross polarization ratio.

In addition, the first + feeding portion is coupled to the substrate arm 130 on which the first + loop arm 230 is formed, + feeds +45 degree power feeding signals, and includes a first + feed substrate 330, a first + feed line 430, a first + ground plane (not shown), and a pair of first + feed pads 530.

The first + feed substrate 330 has an upper end coupled through the balun insertion slot 131 formed in the substrate arm 130. Here, a protrusion 311 may also be formed on the first + feed substrate 330. In addition, the first + feed line 430 is formed on the lower side of one surface of the first + feed substrate 330 in the direction of the first + loop arm 230. The first + feed line 430 is formed in a predetermined pattern, and has one end connected to the first coupling bar 610, to impedance match the power feeding signals applied through the first coupling bar 610. The first + ground plane (not shown) is formed on the other surface of the first + feed substrate 330, that is, to face the first − ground plane 710, but is not electrically connected to the first coupling bar 610 penetrating the first + feed substrate 330. In addition, the pair of first + feed pads 530 is formed on the upper side of one surface of the first + feed substrate 310, spaced apart from the first + feed line 430 and the first coupling bar 610, and is coupled with the first + ground plane, to + feed +45 degree power feeding signals to the first + loop arm 230. Since the pair of first + feed pads 530 also consists of two separate pads electrically connected to both ends of the open loop of the first + loop arm 230, respectively, +45 degree power feeding signals can be + fed independently to both ends of the open loop of the first + loop arm 230.

The second dipole feeding portion also includes a second − feeding portion and a second + feeding portion arranged in parallel with each other and each having an upper end coupled through the balun coupling slot 121 and 141 of two substrate arms 120 and 140 corresponding to the second − loop arm 220 and the second + loop arm 240 among the four substrate arms 110, 120, 130, and 140 of the radiation substrate 100, and applying power feeding signals, respectively corresponding to the two second loop arms 220 and 240, and a second coupling bar 620 connected between the second − feeding portion and the second + feeding portion and transmitting power feeding signals applied to the second − feeding portion to the second + feeding portion.

Here, the configuration of each of the second − feeding portion and the second + feeding portion is similar to that of the first − feeding portion and the first + feeding portion, and thus, are not described in detail herein.

As shown in FIG. 6, the first − feeding portion and the first + feeding portion, the second − feeding portion and the second + feeding portion, which are arranged in parallel to each other, may be joined at their side ends in a vertical direction so that the balun portion 2 has the shape of a square pillar.

Feeding power feeding signals to both ends of the open loop of the corresponding loop arm 210, 220, 230, and 240 through coupling between the ground plane and each of the corresponding pair of feed pads is to improve the isolation between the loop arms 210, 220, 230, and 240 and the adjacent loop arms and to improve the cross polarization ratio.

In the first + feeding portion, the second − feeding portion, and the second + feeding portion as well, feeding power feeding signals to both ends of the open loop of the corresponding loop arm 220, 230, and 240 through coupling between the ground plane and each of the corresponding pair of feed pads is to improve the isolation between the loop arms 220, 230, and 240 and the adjacent loop arms and to improve the cross polarization ratio.

As a result, the low-band radiator and the multi-broadband antenna comprising the same according to this embodiment can not only reduce the influence on the radiation pattern of the high-band radiators by applying loop arms instead of radiation patches, but also significantly reduce the size by additionally forming meander lines and stubs. In addition, the isolation from high-band radiators can be improved by adding parasitic patches, and, even in sizes where a loop arm cannot be formed, the loop structure can be maintained by using a bending line, allowing for further miniaturization. Additionally, a pair of feed pads of the balun portion receives power feeding signals through a coupling method and feeds the corresponding loop arm, thereby improving the isolation between the loop arms and improving the cross polarization ratio.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A low-band radiator, comprising:

a radiation substrate;

a first dipole radiation portion formed from a conductor line on one surface of the radiation substrate and comprising two first loop arms each having the length extending in a predetermined first direction and formed in a loop shape having one end open;

a second dipole radiation portion formed from a conductor line on one surface of the radiation substrate, comprising two second loop arms each having the length extending in a predetermined second direction and formed in a loop shape having one end open, and disposed so as to intersect the first dipole radiation portion; and a balun portion coupled to the other surface of the radiation substrate and applying power feeding signals, respectively corresponding to the first and second loop arms, to two open ends of the loops;

wherein each of the first loop arms and the second loop arms has at least one meander line formed in the inner direction of the loop at a predetermined position of the loop-shaped conductor line, and wherein the low band radiator further includes a parasitic patch formed on the other surface of the radiation substrate at a position that overlaps a predetermined meander line among at least one meander line of each of the first loop arms and the second loop arms.

2. The low-band radiator according to claim 1, wherein each of the first loop arms and the second loop arms further has at least one stub formed in an inner direction of the loop at a predetermined position of the loop-shaped conductor line.

3. The low-band radiator according to claim 1, wherein the radiation substrate is formed in a shape corresponding to the outer shapes of the two first loop arms and the two second loop arms of the first and second dipole radiation portions.

4. The low-band radiator according to claim 1, wherein the radiation substrate has a smaller size than the first and second dipole radiation portions, and each of one first loop arm of the two first loop arms and one second loop arm of the two second loop arms is formed in the form of a loop with the other side cut at a side end of the radiation substrate, and further includes a bending line that connects both ends of the cut loop to each other with a predetermined length to maintain the loop structure of the loop arm, wherein the bending line is bent toward the other surface of the radiation substrate at the side end of the radiation substrate.

5. The low-band radiator according to claim 1, wherein the balun portion includes four pairs of feed pads that receive power feeding signals for each of the two first loop arms and each of the two second loop arms and feed the power feeding signals to the corresponding loop arms, and two feed pads from each of the four pairs of feed pads feed the same power feeding signals to both open ends of the corresponding loop arm.

6. The low-band radiator according to claim 1, wherein the balun portion includes:

a first dipole feeding portion including two first feeding portions arranged in parallel with each other and each having an upper end coupled to the radiation substrate to apply power feeding signals respectively corresponding to the two first loop arms and a first coupling bar connected between the two first feeding portions and transmitting power feeding signals applied to one of the two first feeding portions to the remaining first feeding portion; and a second dipole feeding portion including two second feeding portions arranged in parallel with each other and each having an upper end coupled to the radiation substrate to apply power feeding signals respectively corresponding to the two second loop arms and a second coupling bar connected between the two second feeding portions and transmitting power feeding signals applied to one of the two second feeding portions to the remaining second feeding portion.

7. The low-band radiator according to claim 6, wherein a first − feeding portion among the two first feeding portions includes:

a first − feed substrate whose upper end penetrates the radiation substrate and is coupled at a position corresponding to a first − loop arm of the two first loop arms;

a first − feed line formed on the lower side of one surface of the first − feed substrate in the direction of the first − loop arm and impedance matching and transmitting a first power feeding signal applied to the first coupling bar connected through the feed substrate;

a first − ground plane formed on the other surface of the first − feed substrate so as not to be electrically connected to the first coupling bar penetrating the first − feed substrate; and a pair of first − feed pads formed on an upper side of one surface of the first − feed substrate and spaced apart from the first − feed line and coupled to the first − ground plane, electrically connected to both ends of the open loop of the first − loop arm, respectively, to − feed the first power feeding signal to the first − loop arm, and wherein a first + feeding portion among the two first feeding portions includes:

a first + feed substrate whose upper end penetrates the radiation substrate and is coupled at a position corresponding to a first + loop arm of the two first loop arms;

a first + feed line formed on the lower side of one surface of the first + feed substrate in the direction of the first + loop arm and impedance matching the first power feeding signal transmitted through the first coupling bar;

a first + ground plane formed on the other surface of the first + feed substrate so as not to be electrically connected to the first coupling bar penetrating the first + feed substrate; and a pair of first + feed pads formed on an upper side of one surface of the first + feed substrate and spaced apart from the first + feed line and coupled to the first + ground plane, electrically connected to both ends of the open loop of the first + loop arm, respectively, to + feed the first power feeding signal to the first + loop arm.

8. The low-band radiator according to claim 6, wherein a second − feeding portion among the two second feeding portions includes:

a second − feed substrate whose upper end penetrates the radiation substrate and is coupled at a position corresponding to a second − loop arm of the two second loop arms;

a second − feed line formed on the lower side of one surface of the second − feed substrate in the direction of the second − loop arm and impedance matching and transmitting a second power feeding signal applied to the second coupling bar connected through the feed substrate;

a second − ground plane formed on the other surface of the second − feed substrate so as not to be electrically connected to the second coupling bar penetrating the second − feed substrate; and a pair of second − feed pads formed on an upper side of one surface of the second − feed substrate and spaced apart from the second − feed line and coupled to the second − ground plane, electrically connected to both ends of the open loop of the second − loop arm, respectively, to − feed the second power feeding signal to the second − loop arm, and wherein a second + feeding portion among the two second feeding portions includes:

a second + feed substrate whose upper end penetrates the radiation substrate and is coupled at a position corresponding to a second + loop arm of the two second loop arms;

a second + feed line formed on the lower side of one surface of the second + feed substrate in the direction of the second + loop arm and impedance matching the second power feeding signal transmitted through the second coupling bar;

a second + ground plane formed on the other surface of the second + feed substrate so as not to be electrically connected to the second coupling bar penetrating the second + feed substrate; and a pair of second + feed pads formed on an upper side of one surface of the second + feed substrate and spaced apart from the second + feed line and coupled to the second + ground plane, electrically connected to both ends of the open loop of the second + loop arm, respectively, to + feed the second power feeding signal to the second + loop arm.

9. A multi-broadband antenna, comprising:

a reflector;

a plurality of high-band radiators arranged in the direction of one surface of the reflector;

a plurality of low-band radiators arranged to be spaced apart from the high-band radiators and at a predetermined interval in the direction of one surface of the reflector, wherein each of the plurality of low-band radiators comprises:

a radiation substrate;

a first dipole radiation portion formed from a conductor line on one surface of the radiation substrate and comprising two first loop arms each having the length extending in a predetermined first direction and formed in a loop shape with a partially open structure;

a second dipole radiation portion formed from a conductor line on one surface of the radiation substrate, comprising two second loop arms each having the length extending in a predetermined second direction and formed in a loop shape with a partially open structure, and disposed so as to intersect the first dipole radiation portion; and a balun portion coupled between the reflector and the other surface of the radiation substrate, supporting the radiation substrate, and applying power feeding signals, corresponding to each of the first and second loop arms, to two open ends of the loops, wherein each of the first loop arms and the second loop arms has at least one meander line formed in the inner direction of the loop at a predetermined position of the loop-shaped conductor line; and wherein each of the low band radiator further includes a parasitic patch formed on the other surface of the radiation substrate at a position that overlaps a predetermined meander line among at least one meander line of each of the first loop arms and the second loop arms.

10. The multi-broadband antenna according to claim 9, wherein each of the first loop arms and the second loop arms further has at least one stub formed in an inner direction of the loop at a predetermined position of the loop-shaped conductor line.

11. The multi-broadband antenna according to claim 9, wherein the radiation substrate is formed in a shape corresponding to the outer shapes of the two first loop arms and the two second loop arms of the first and second dipole radiation portions.

12. The multi-broadband antenna according to claim 9, wherein the radiation substrate has a smaller size than the first and second dipole radiation portions, and each of one first loop arm of the two first loop arms and one second loop arm of the two second loop arms is formed in the form of a loop with the other side cut at a side end of the radiation substrate, and further includes a bending line that connects both ends of the cut loop to each other with a predetermined length to maintain the loop structure of the loop arm, wherein the bending line is bent toward the other surface of the radiation substrate at the side end of the radiation substrate.

13. The multi-broadband antenna according to claim 9, wherein the balun portion includes four pairs of feed pads that receive power feeding signals for each of the two first loop arms and each of the two second loop arms and feed the power feeding signals to the corresponding loop arms, and two feed pads from each of the four pairs of feed pads feed the same power feeding signals to both open ends of the corresponding loop arm.

14. The multi-broadband antenna according to claim 9, wherein the balun portion includes:

a first dipole feeding portion including two first feeding portions arranged in parallel with each other and each having an upper end coupled to the radiation substrate and a lower end coupled to the reflector, to apply power feeding signals respectively corresponding to the two first loop arms and a first coupling bar connected between the two first feeding portions and transmitting power feeding signals applied to one of the two first feeding portions to the remaining first feeding portion; and a second dipole feeding portion including two second feeding portions arranged in parallel with each other and each having an upper end coupled to the radiation substrate and a lower end coupled to the reflector, to apply power feeding signals respectively corresponding to the two second loop arms and a second coupling bar connected between the two second feeding portions and transmitting power feeding signals applied to one of the two second feeding portions to the remaining second feeding portion.

* * * * *